United States Patent
Liu et al.

(10) Patent No.: US 8,073,019 B2
(45) Date of Patent: Dec. 6, 2011

(54) 810 NM ULTRA-SHORT PULSED FIBER LASER

(76) Inventors: Jian Liu, Sunnyvale, CA (US); Lihmei Yang, Palo Alto, CA (US)

( * ) Notice: Subject to any disclaimer, the term of this patent is extended or adjusted under 35 U.S.C. 154(b) by 0 days.

(21) Appl. No.: 12/715,596

(22) Filed: Mar. 2, 2010

(65) Prior Publication Data

US 2010/0220752 A1    Sep. 2, 2010

Related U.S. Application Data

(60) Provisional application No. 61/208,934, filed on Mar. 2, 2009.

(51) Int. Cl.
*H01S 3/30* (2006.01)
*H01S 3/00* (2006.01)

(52) U.S. Cl. .............................. 372/6; 359/341.1

(58) Field of Classification Search .............. 372/5, 6; 359/341.1
See application file for complete search history.

(56) References Cited

U.S. PATENT DOCUMENTS

| | | | | |
|---|---|---|---|---|
| 4,967,416 A | * | 10/1990 | Esterowitz et al. | 372/6 |
| 5,313,477 A | * | 5/1994 | Esterowitz et al. | 372/6 |
| 5,541,947 A | * | 7/1996 | Mourou et al. | 372/25 |
| 6,014,389 A | * | 1/2000 | Wiest | 372/6 |
| 6,208,458 B1 | * | 3/2001 | Galvanauskas et al. | 359/345 |
| 2009/0046289 A1 | * | 2/2009 | Caldwell et al. | 356/341 |
| 2009/0244695 A1 | * | 10/2009 | Marcinkevicius et al. | 359/340 |

OTHER PUBLICATIONS

L.-M. Yang, T. Sosnowski, M. L. Stock, T. B. Norris, J. Squier, G. Mourou, M. Dennis and I. Durling III, "Chirped-pulse amplification of ultrashort pulses with a multimode Tm:ZBLAN fiber upconversion amplifier," Optics Letters 20, 1044 (1995).

* cited by examiner

*Primary Examiner* — Tod T Van Roy
*Assistant Examiner* — Phillip Nguyen
(74) *Attorney, Agent, or Firm* — John M. Taboada

(57) ABSTRACT

Methods and systems for generating ultra-short fiber laser pulses are disclosed, including generating a signal laser pulse from a seed fiber laser; using a pulse stretcher comprising an input and an output, wherein the signal laser pulse is coupled into the input of the pulse stretcher; using a Tm:ZBLAN fiber comprising an input and an output, wherein the stretched signal laser pulse from the output of the pulse stretcher is coupled into the input of the Tm:ZBLAN fiber; using a pump laser coupled to either the output or the input of the Tm:Z-BLAN fiber to amplify the stretched signal laser pulse; and using a compressor comprising an input and an output, wherein the output of the Tm:ZBLAN fiber is coupled to the input of the compressor and the output of the compressor emits the amplified signal laser pulse. Other embodiments are described and claimed.

44 Claims, 5 Drawing Sheets

810 NM ULTRA-SHORT PULSED FIBER LASER

I. CROSS REFERENCE TO RELATED APPLICATIONS

The inventors claim priority to provisional patent application No. 61/208,934 filed on Mar. 2, 2009.

II. BACKGROUND

The invention relates generally to the field of ultra-short pulse fiber lasers operating at wavelengths around 810 nm.

III. SUMMARY

In one respect, disclosed is an ultra-short pulse fiber laser comprising: a seed fiber laser; a pulse stretcher comprising an input and an output, wherein the seed fiber laser is coupled to the input of the pulse stretcher; a Tm:ZBLAN fiber comprising an input and an output, wherein the output of the pulse stretcher is coupled to the input of the Tm:ZBLAN fiber; a pump laser coupled to the output of the Tm:ZBLAN fiber; and a compressor comprising an input and an output, wherein the output of the TM:ZBLAN fiber is coupled to the input of the compressor and the output of the compressor is configured to emit a laser pulse.

In another respect, disclosed is an ultra-short pulse fiber laser comprising: a seed fiber laser; a pulse stretcher comprising an input and an output, wherein the seed fiber laser is coupled to the input of the pulse stretcher; a Tm:ZBLAN fiber comprising an input and an output, wherein the output of the pulse stretcher is coupled to the input of the Tm:ZBLAN fiber; a pump laser coupled to the input of the Tm:ZBLAN fiber; and a compressor comprising an input and an output, wherein the output of the TM:ZBLAN fiber is coupled to the input of the compressor and the output of the compressor is configured to emit a laser pulse.

In another respect, disclosed is a method for generating ultra-short fiber laser pulses, the method comprising: generating a signal laser pulse from a seed fiber laser; using a pulse stretcher comprising an input and an output, wherein the signal laser pulse is coupled into the input of the pulse stretcher; using a Tm:ZBLAN fiber comprising an input and an output, wherein the stretched signal laser pulse from the output of the pulse stretcher is coupled into the input of the Tm:ZBLAN fiber; using a pump laser coupled to the output of the Tm:ZBLAN fiber to amplify the stretched signal laser pulse; and using a compressor comprising an input and an output, wherein the output of the Tm:ZBLAN fiber is coupled to the input of the compressor and the output of the compressor emits the amplified signal laser pulse.

In yet another respect, disclosed is a method for generating ultra-short fiber laser pulses, the method comprising: generating a signal laser pulse from a seed fiber laser; using a pulse stretcher comprising an input and an output, wherein the signal laser pulse is coupled into the input of the pulse stretcher; using a Tm:ZBLAN fiber comprising an input and an output, wherein the stretched signal laser pulse from the output of the pulse stretcher is coupled into the input of the Tm:ZBLAN fiber; using a pump laser coupled to the input of the Tm:ZBLAN fiber to amplify the stretched signal laser pulse; and using a compressor comprising an input and an output, wherein the output of the Tm:ZBLAN fiber is coupled to the input of the compressor and the output of the compressor emits the amplified signal laser pulse.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 1:
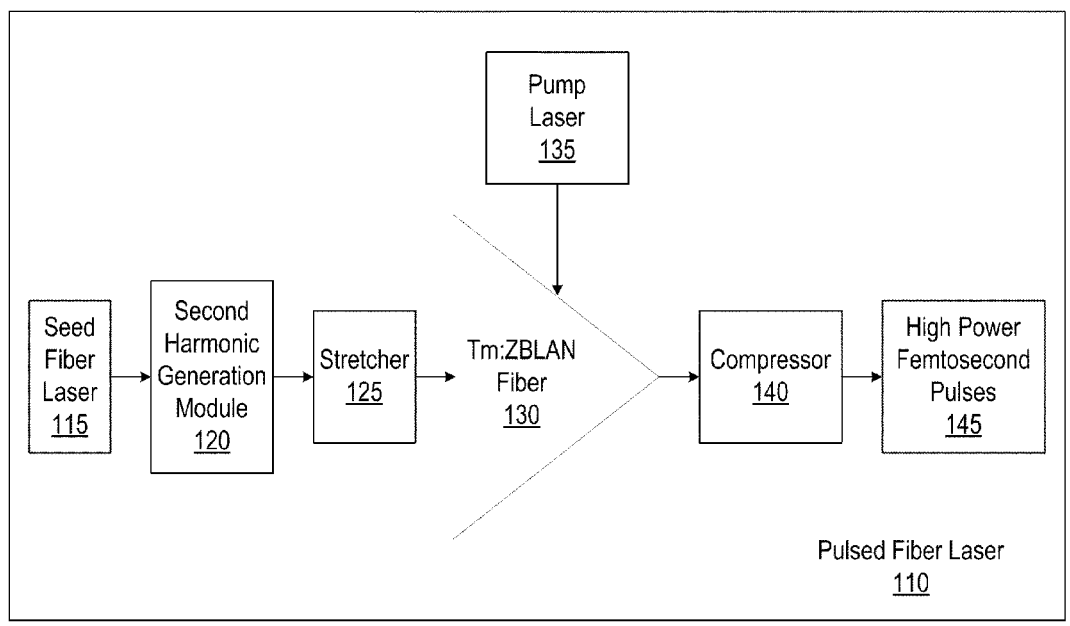
FIG. 1 is a block diagram illustrating an ultra-short pulse fiber laser, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

One way to produce ultra-short pulses is to use a Ti:Sapphire solid state laser. Conventional Ti:Sapphire solid state laser systems are physically bulky and are expensive to purchase and maintain. Fiber lasers on the other hand are more compact and cheaper to purchase and maintain. Unfortunately, the power and energy levels of typical fiber lasers at 1550 nm and even the second harmonic generation between 750 nm-810 nm, is on the order of tens of milliwatts. These power levels are lower than conventional Ti:Sapphire solid state laser power levels and therefore fiber laser power levels need to be raised in order for fiber lasers to replace conventional Ti:Sapphire solid state lasers. One such laser, a fiber based, high power, ultrafast fiber laser operating at 750 nm-850 nm is disclosed in this patent.

FIG. 1 is a block diagram illustrating an ultra-short pulse fiber laser, in accordance with some embodiments.

In some embodiments, a pulsed fiber laser 110 operating at 750 nm-850 nm comprises a seed fiber laser 115, such as a 1550 nm femtosecond (fs) fiber laser, coupled into a second harmonic generation (SHG) module 120 operating between 10 mW to 200 mW at a wavelength around 810 nm. The output from the SHG module 120 is then coupled to a stretcher 125, such as a fiber stretcher, a grating pair stretcher, or a glass stretcher, to stretch the seed pulse before being coupled to a Tm:ZBLAN fiber 130. A pump laser 135 pumps the Tm:ZBLAN fiber 130 and amplifies the seed pulse by utilizing an upconversion mechanism of the Tm:ZBLAN fiber 130. After the laser pulse has been amplified, the pulse is compressed by a grating compressor 140. What results are high power, femtosecond pulses 145 at 810 nm emitted from the pulsed fiber laser 110.

Figure 2:
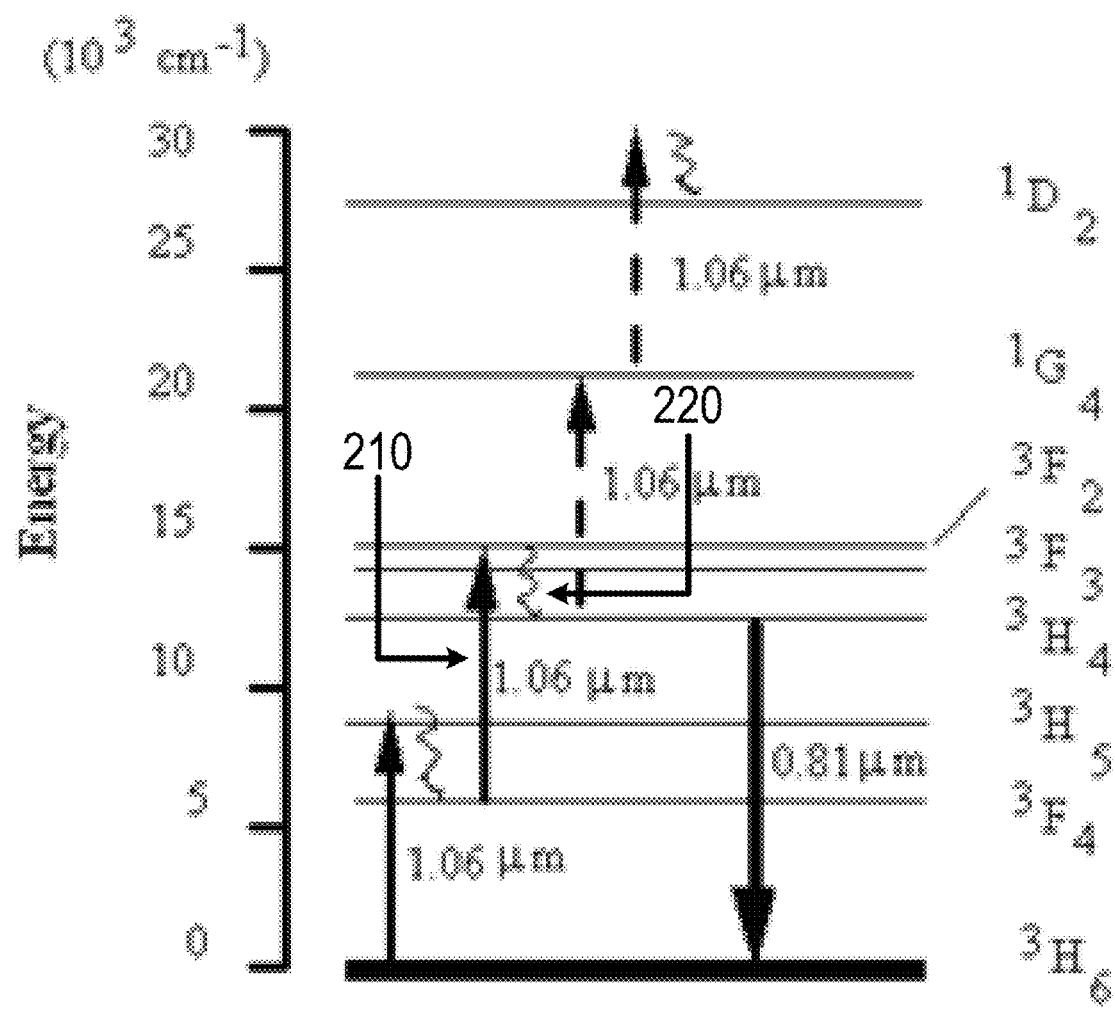
FIG. 2 is a partial energy level diagram of Tm:ZBLAN fiber illustrating the upconversion mechanism, in accordance with some embodiments.

FIG. 2 is a partial energy level diagram of Tm:ZBLAN fiber illustrating the upconversion mechanism, in accordance with some embodiments.

In some embodiments, the upconversion process of Tm:ZBLAN fiber causes an increased excited state absorption (ESA) from state $^3F_4$ to state $^3F_2$, 210. With a high doping level, greater than 1% mol, of Thulium (TM), a cycle of strong resonant ESA on the $^3F_4$ to state $^3F_2$ transition followed by fast nonradiative decay to the $^3H_4$ level, 220, is repeated. This process results in the necessary population inversion from the ground state $^3H_6$ to the upper level energy state $^3H_4$. This process is similar to that in Er:ZBLAN fiber where the lower level state $^4H_{13/2}$ is depopulated quickly and efficiently by either ESA or energy transfer.

Figure 3:
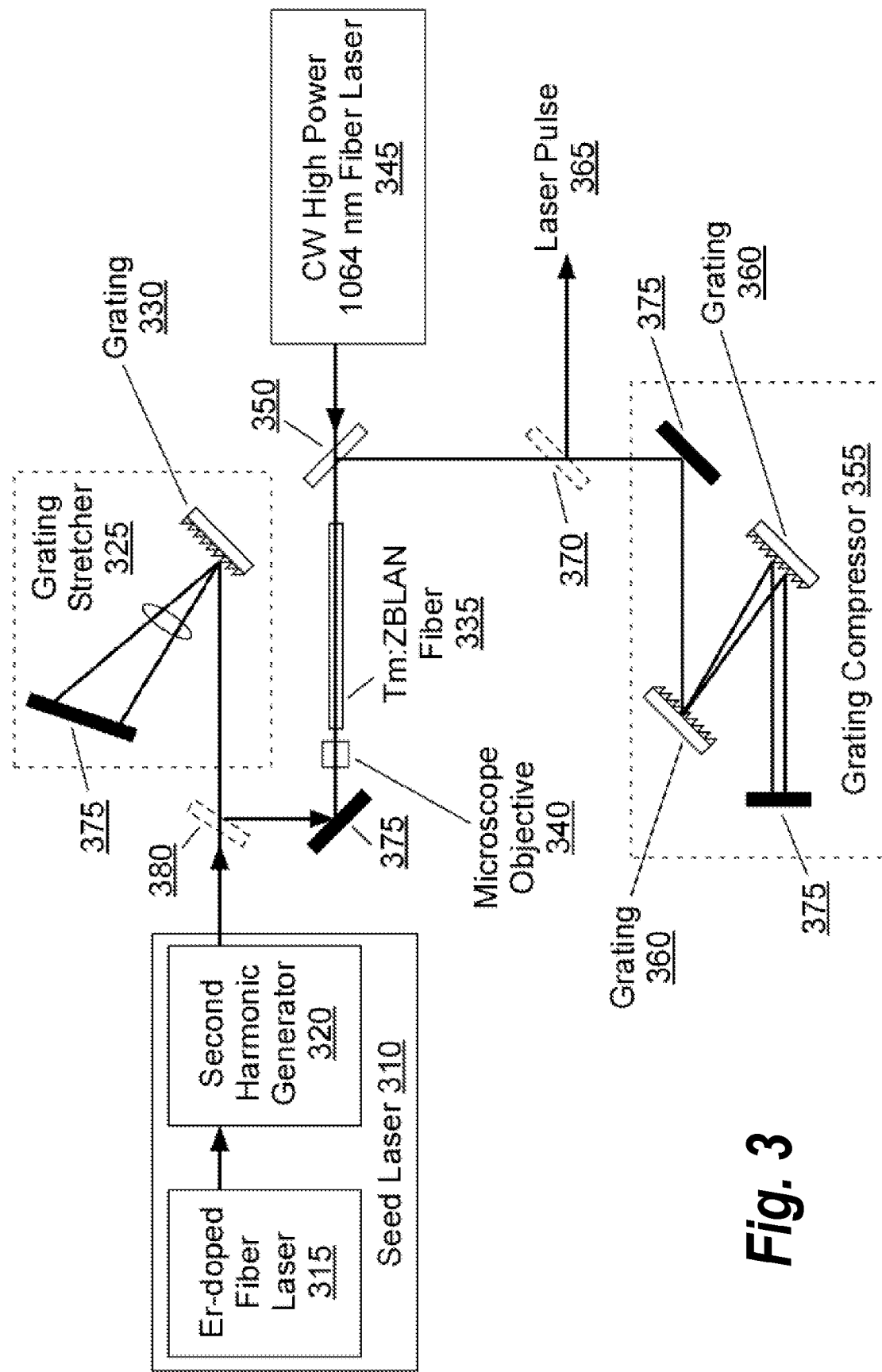
FIG. 3 is a schematic representation of the Tm:ZBLAN fiber upconversion amplifier employing the chirped pulse amplification technique and fiber lasers as seed and pump, in accordance with some embodiments.

FIG. 3 is a schematic representation of the Tm:ZBLAN fiber upconversion amplifier employing the chirped pulse amplification technique and fiber lasers as seed and pump, in accordance with some embodiments.

In some embodiments, a Tm:ZBLAN fiber and a pump fiber laser are used for the chirped pulse amplification of ultra-short pulses. The seed laser 310 comprises an Er-doped fiber laser system 315 operating at 1550 nm-1620 nm and a second harmonic generator 320 to frequency double. The seed fiber laser 310 produces femtosecond pulses at 810 nm. The Mercury series from PolarOnyx, Inc. may be used as the seed laser 310. Next the signal pulse from the seed laser 310 is stretched to longer pulse duration in order to avoid intensity saturation and damage to the amplifier. The signal pulse is stretched to 1 ps to 10 ns by a positive group velocity delay using a grating stretcher 325, such as a four-pass stretcher. The grating stretcher 325 has a grating 330 with 2400 lines per mm and is arranged in a folded, double pass geometry with an incident angle near the Littrow angle of 72° in order to achieve better efficiency. The stretched pulse is next coupled into the Tm:ZBLAN fiber 335 by a 5× microscope objective 340. The Tm:ZBLAN fiber 335 may comprise single mode core or multimode core fiber and may either be single cladding or double cladding fiber. The Tm:ZBLAN fiber 335 is pumped by a wavelength in the spectral range of 950 nm-1200 nm. One such laser is a CW high power 1064 nm fiber laser 345 coupled with a dichroic mirror 350 arranged either to counter-propagate or co-propagate with the stretched signal. The counter-propagation arrangement results in a higher amplification than the co-propagation arrangement. The counter-propagation arrangement is illustrated in FIG. 3. The pump laser 345 may be the Mars Series from PolarOnyx, Inc. The amplified pulses have pulse widths ranging from 1 ps to 1 μs and have a pulse repetition rate between 1 Hz to 1 GHz. After being amplified, the signal pulse is compressed by a grating compressor 355 comprised of a pair of gratings 360 having 2400 lines per mm. Finally, the high power, ultra-short laser pulses 365 are output using a high reflectivity mirror 370. The laser pulses 365 are in the wavelength range from 750 nm-850 nm and have pulse energy ranging from 1 nJ to 1 mJ with pulse widths ranging from 10 fs to 100 ps. Throughout the chirped pulse amplifier, various high reflectivity mirrors 375 and 380 are utilized to direct the laser pulse. In high reflectivity mirrors 370 and 380, the incoming and outgoing light does not overlap.

Figure 4:
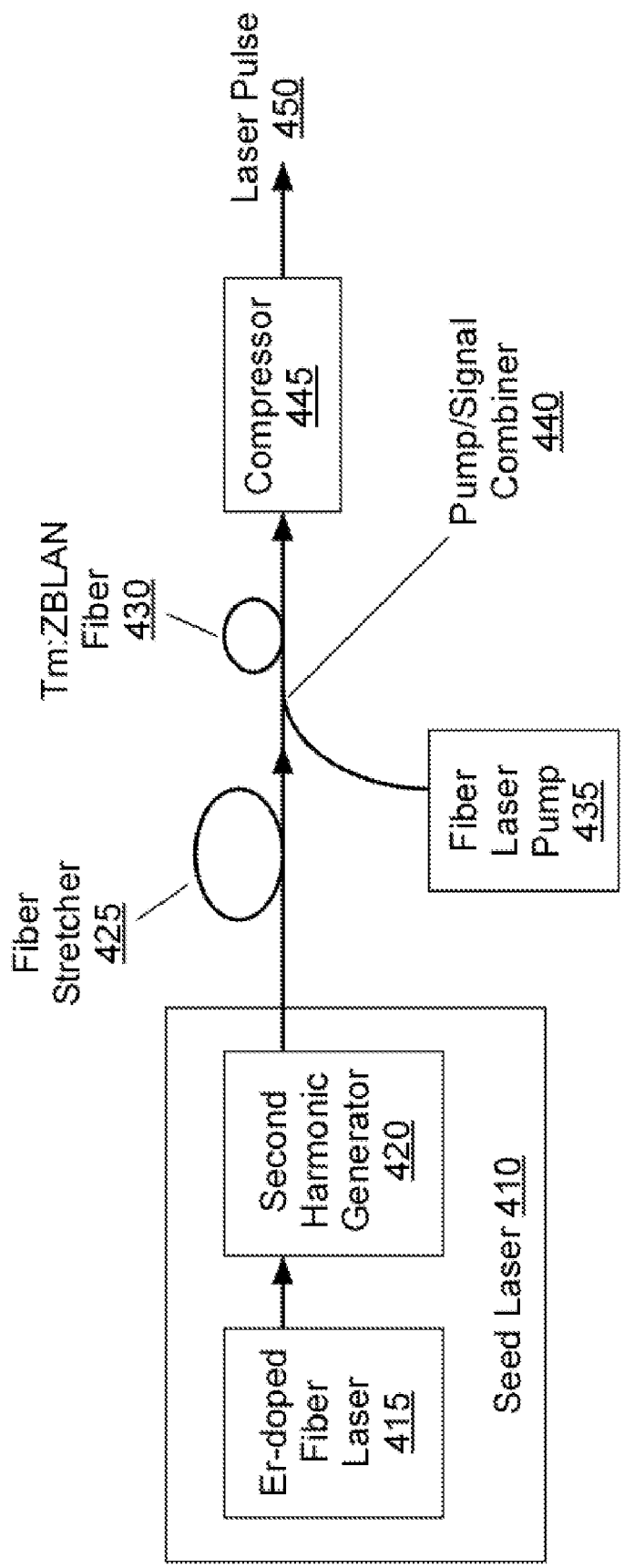
FIG. 4 is a schematic representation of the Tm:ZBLAN fiber upconversion amplifier employing all fiber components, in accordance with some embodiments.

FIG. 4 is a schematic representation of the Tm:ZBLAN fiber upconversion amplifier employing all fiber components, in accordance with some embodiments.

In some embodiments, a Tm:ZBLAN fiber amplifier may use all fiber components for the chirped amplification of ultra-short pulses. Using all fiber components eliminates the complexity of free space components. The seed laser 410 comprises an Er-doped fiber laser system 415 operating at 1550 nm-1620 nm and a second harmonic generator 420 to frequency double. The seed fiber laser 410 produces femtosecond pulses at 810 nm. The Mercury series from PolarOnyx, Inc. may be used as the seed laser 410. Next the signal pulse from the seed laser 410 is stretched to longer pulse duration in order to avoid intensity saturation and damage to the amplifier. The signal pulse is stretched to 1 ps to 10 ns by a positive group velocity delay using a fiber stretcher 425. The stretched pulse is next coupled into the Tm:ZBLAN fiber 430. The Tm:ZBLAN fiber 430 may comprise single mode core or multimode core fiber and may either be single cladding or double cladding fiber. The Tm:ZBLAN fiber 430 is pumped by a wavelength in the spectral range of 950 nm-1200 nm. One such laser is a CW high power 1064 nm fiber laser 435 coupled using a fiber based pump/signal combiner 440. The pump fiber laser 435 may either be arranged to counter-propagate or co-propagate with the stretched signal. The counter-propagation arrangement results in a higher amplification than the co-propagation arrangement. The co-propagation arrangement is illustrated in FIG. 4. The pump fiber laser 435 may be the Mars Series from PolarOnyx, Inc. The amplified pulses have pulse widths ranging from 1 ps to 1 μs and have a pulse repetition rate between 1 Hz to 1 GHz. After being amplified, the signal pulse is compressed by using a photonic crystal fiber or photonic bandgap fiber (PBF) compressor 445, such as PBF fiber from Crystal Fibers in Denmark, operating at anomalous dispersion. From the compressor 445 result high power, ultra-short laser pulses 450 in the wavelength range from 750 nm-850 nm and having pulse energy ranging from 1 nJ to 1 mJ with pulse widths ranging from 10 fs to 100 ps.

Figure 5:
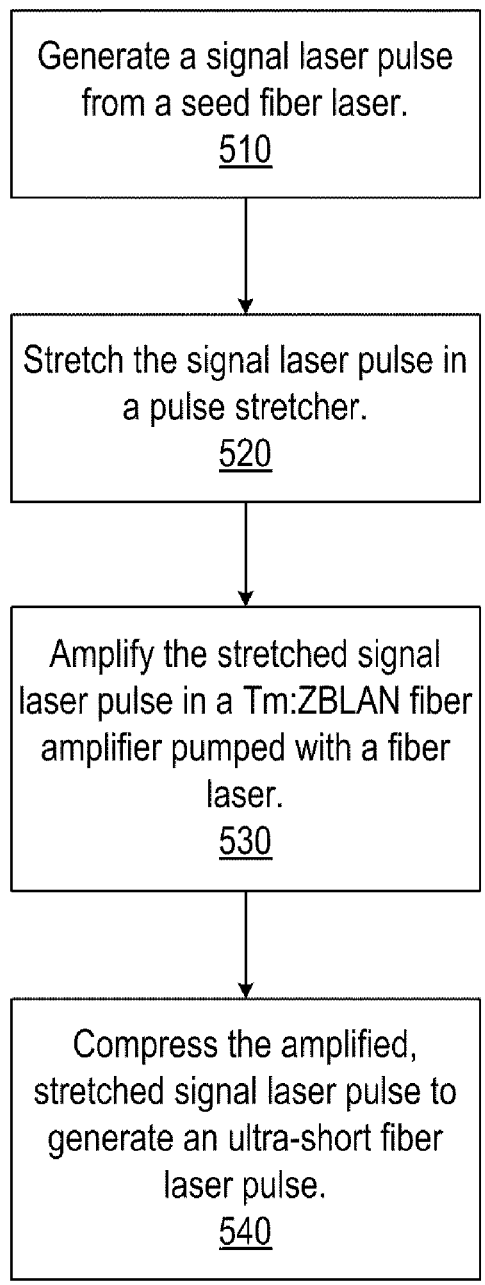
FIG. 5 is a block diagram illustrating a method for generating an ultra-short fiber laser pulse, in accordance with some embodiments.

FIG. 5 is a block diagram illustrating a method for generating an ultra-short fiber laser pulse, in accordance with some embodiments.

In some embodiments, a seed fiber laser is used to generate a signal laser pulse 510. The signal laser pulse is then stretched by a pulse stretcher 520. The stretched signal laser pulse is then coupled into a Tm:ZBLAN fiber where the stretched signal laser pulse is amplified by either a counter-propagating or a co-propagating laser pulse from a pump fiber laser 530. The amplified, stretched signal laser pulse is then compressed to generate an ultra-short fiber laser pulse 540.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An ultra-short pulse fiber laser comprising:
   a seed fiber laser, wherein the seed fiber laser comprises an Er-doped fiber laser and a second harmonic generator;
   a pulse stretcher comprising an input and an output, wherein the seed fiber laser is coupled to the input of the pulse stretcher;
   a Tm:ZBLAN fiber comprising an input and an output, wherein the output of the pulse stretcher is coupled to the input of the Tm:ZBLAN fiber;
   a pump laser comprising a CW fiber laser and coupled to the output of the Tm:ZBLAN fiber; and
   a compressor comprising an input and an output, wherein the output of the TM:ZBLAN fiber is coupled to the input of the compressor and the output of the compressor is configured to emit a laser pulse.

2. The ultra-short pulse fiber laser of claim 1, where the pulse stretcher is a grating stretcher or a fiber stretcher.

3. The ultra-short pulse fiber laser of claim 1, where the compressor is at least one of: a grating compressor, a photonic crystal fiber compressor, and a photonic bandgap fiber compressor.

4. The ultra-short pulse fiber laser of claim 1, where the pump laser is a fiber laser with a center lasing wavelength ranging from 950 nm to 1200 nm 5. The ultra-short pulse fiber laser of claim 1, where the emitted laser pulse has a wavelength ranging from 750 nm to 850 nm.

6. The ultra-short pulse fiber laser of claim 1, where the emitted laser pulse has a pulse repetition rate ranging from 1 Hz to 1 GHz.

7. The ultra-short pulse fiber laser of claim 1, where the emitted laser pulse has a single pulse energy ranging from 1 nJ to 1 mJ.

8. The ultra-short pulse fiber laser of claim 1, where the emitted laser pulse has a pulse width ranging from 10 fs to 100 ps.

9. The ultra-short pulse fiber laser of claim 1, where the ZBLAN fiber comprises a single mode core or a multimode core.

10. The ultra-short pulse fiber laser of claim 1, where the ZBLAN fiber comprises a single cladding or a double cladding.

11. The ultra-short pulse fiber laser of claim 1, where the pump laser is coupled to the output of the Tm:ZBLAN fiber with a dichroic mirror or a fiber based pump/signal combiner.

12. A method for generating ultra-short fiber laser pulses, the method comprising:
   generating a signal laser pulse from a seed fiber laser, wherein the seed fiber laser comprises an Er-doped fiber laser and a second harmonic generator;
   using a pulse stretcher comprising an input and an output, wherein the signal laser pulse is coupled into the input of the pulse stretcher;
   using a Tm:ZBLAN fiber comprising an input and an output, wherein the stretched signal laser pulse from the output of the pulse stretcher is coupled into the input of the Tm:ZBLAN fiber;
   using a pump laser comprising a CW fiber laser and coupled to the output of the Tm:ZBLAN fiber to amplify the stretched signal laser pulse; and
   using a compressor comprising an input and an output, wherein the output of the Tm:ZBLAN fiber is coupled to the input of the compressor and the output of the compressor emits the amplified signal laser pulse.

13. The method of claim 12, wherein the pulse stretcher is a grating stretcher or a fiber stretcher.

14. The method of claim 12, wherein the compressor is at least one of: a grating compressor, a photonic crystal fiber compressor, and a photonic bandgap fiber compressor.

15. The method of claim 12, wherein the pump laser is a fiber laser with a center lasing wavelength ranging from 950 nm to 1200 nm.

16. The method of claim 12, wherein the emitted amplified signal laser pulse has a wavelength ranging from 750 nm to 850 nm.

17. The method of claim 12, wherein the emitted amplified signal laser pulse has a pulse repetition rate ranging from 1 Hz to 1 GHz.

18. The method of claim 12, wherein the emitted amplified signal laser pulse has a single pulse energy ranging from 1 nJ to 1 mJ.

19. The method of claim 12, wherein the emitted amplified signal laser pulse has a pulse width ranging from 10 fs to 100 ps.

20. The method of claim 12, wherein the ZBLAN fiber comprises a single mode core or a multimode core.

21. The method of claim 12, wherein the ZBLAN fiber comprises a single cladding or a double cladding.

22. The method of claim 12, wherein the pump laser is coupled to the output of the Tm:ZBLAN fiber with a dichroic mirror or a fiber based pump/signal combiner.

23. An ultra-short pulse fiber laser comprising:
   a seed fiber laser, wherein the seed fiber laser comprises an Er-doped fiber laser and a second harmonic generator;
   a pulse stretcher comprising an input and an output, wherein the seed fiber laser is coupled to the input of the pulse stretcher;
   a Tm:ZBLAN fiber comprising an input and an output, wherein the output of the pulse stretcher is coupled to the input of the Tm:ZBLAN fiber;
   a pump laser comprising a CW fiber laser and coupled to the input of the Tm:ZBLAN fiber; and
   a compressor comprising an input and an output, wherein the output of the TM:ZBLAN fiber is coupled to the input of the compressor and the output of the compressor is configured to emit a laser pulse.

24. The ultra-short pulse fiber laser of claim 23, where the pulse stretcher is a grating stretcher or a fiber stretcher.

25. The ultra-short pulse fiber laser of claim 23, where the compressor is at least one of: a grating compressor, a photonic crystal fiber compressor, and a photonic bandgap fiber compressor.

26. The ultra-short pulse fiber laser of claim 23, where the pump laser is a fiber laser with a center lasing wavelength ranging from 950 nm to 1200 nm.

27. The ultra-short pulse fiber laser of claim 23, where the emitted laser pulse has a wavelength ranging from 750 nm to 850 nm.

28. The ultra-short pulse fiber laser of claim 23, where the emitted laser pulse has a pulse repetition rate ranging from 1 Hz to 1 GHz.

29. The ultra-short pulse fiber laser of claim 23, where the emitted laser pulse has a single pulse energy ranging from 1 nJ to 1 mJ.

30. The ultra-short pulse fiber laser of claim 23, where the emitted laser pulse has a pulse width ranging from 10 fs to 100 ps.

31. The ultra-short pulse fiber laser of claim 23, where the ZBLAN fiber comprises a single mode core or a multimode core.

32. The ultra-short pulse fiber laser of claim 23, where the ZBLAN fiber comprises a single cladding or a double cladding.

33. The ultra-short pulse fiber laser of claim 23, where the pump laser is coupled to the input of the Tm:ZBLAN fiber with a dichroic mirror or a fiber based pump/signal combiner.

34. A method for generating ultra-short fiber laser pulses, the method comprising:
   generating a signal laser pulse from a seed fiber laser, wherein the seed fiber laser comprises an Er-doped fiber laser and a second harmonic generator;
   using a pulse stretcher comprising an input and an output, wherein the signal laser pulse is coupled into the input of the pulse stretcher;
   using a Tm:ZBLAN fiber comprising an input and an output, wherein the stretched signal laser pulse from the output of the pulse stretcher is coupled into the input of the Tm:ZBLAN fiber;
   using a pump laser comprising a CW fiber laser and coupled to the input of the Tm:ZBLAN fiber to amplify the stretched signal laser pulse; and
   using a compressor comprising an input and an output, wherein the output of the Tm:ZBLAN fiber is coupled to the input of the compressor and the output of the compressor emits the amplified signal laser pulse.

35. The method of claim 34, wherein the pulse stretcher is a grating stretcher or a fiber stretcher.

36. The method of claim 34, wherein the compressor is at least one of: a grating compressor, a photonic crystal fiber compressor, and a photonic bandgap fiber compressor.

37. The method of claim 34, wherein the pump laser is a fiber laser with a center lasing wavelength ranging from 950 nm to 1200 nm.

38. The method of claim 34, wherein the emitted amplified signal laser pulse has a wavelength ranging from 750 nm to 850 nm.

39. The method of claim 34, wherein the emitted amplified signal laser pulse has a pulse repetition rate ranging from 1 Hz to 1 GHz.

40. The method of claim 34, wherein the emitted amplified signal laser pulse has a single pulse energy ranging from 1 nJ to 1 mJ.

41. The method of claim 34, wherein the emitted amplified signal laser pulse has a pulse width ranging from 10 fs to 100 ps.

42. The method of claim 34, wherein the ZBLAN fiber comprises a single mode core or a multimode core.

43. The method of claim 34, wherein the ZBLAN fiber comprises a single cladding or a double cladding.

44. The method of claim 34, wherein the pump laser is coupled to the input of the Tm:ZBLAN fiber with a dichroic mirror or a fiber based pump/signal combiner.

* * * * *